(12) United States Patent
Cooper et al.

(10) Patent No.: US 8,719,382 B2
(45) Date of Patent: May 6, 2014

(54) METHOD AND SYSTEM FOR DATA PROCESSING

(75) Inventors: Jared Klineman Cooper, Palm Bay, FL (US); John Brand, Melbourne, FL (US); Todd William Goodermuth, Melbourne, FL (US); Scott Nelson, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 448 days.

(21) Appl. No.: 12/969,702

(22) Filed: Dec. 16, 2010

(65) Prior Publication Data

US 2012/0158910 A1 Jun. 21, 2012

(51) Int. Cl.
*G06F 15/16* (2006.01)

(52) U.S. Cl.
USPC .................. 709/219; 709/217; 709/228

(58) Field of Classification Search
USPC .................. 709/217–219, 225–229
See application file for complete search history.

(56) References Cited

U.S. PATENT DOCUMENTS

| 4,455,483 | A | * | 6/1984 | Schonhuber | 705/28 |
| 8,447,804 | B2 | * | 5/2013 | Bai et al. | 709/228 |
| 2005/0198313 | A1 | * | 9/2005 | Branigan et al. | 709/228 |
| 2005/0253926 | A1 | | 11/2005 | Chung et al. | |
| 2005/0273473 | A1 | * | 12/2005 | Grace et al. | 707/104.1 |
| 2006/0095193 | A1 | * | 5/2006 | Nishira et al. | 701/96 |
| 2006/0229980 | A1 | * | 10/2006 | Habaguchi | 705/40 |
| 2010/0256836 | A1 | * | 10/2010 | Mudalige | 701/2 |
| 2011/0225269 | A1 | * | 9/2011 | Yap et al. | 709/219 |

* cited by examiner

*Primary Examiner* — Bharat N Barot
(74) *Attorney, Agent, or Firm* — GE Global Patent Operation; John A. Kramer

(57) ABSTRACT

Methods and systems are provided for processing data generated in a vehicle group. One example embodiment comprises evaluating one or more quality parameters of a first data set generated at a first vehicle in the vehicle group by a first data capture device, and based on the evaluation, off-boarding the first data set for storage purposes. Based on a link quality of a communication system of the vehicle group, the first data set may be off-boarded to a second vehicle in the vehicle group or to a remote storage device. In one example, if the quality parameter of the first data set is higher, the data may be stored on a second vehicle, while if the quality parameter of the first data set is lower, a second data set generated at the second vehicle by a second data capture device may be stored on the second vehicle.

27 Claims, 3 Drawing Sheets

METHOD AND SYSTEM FOR DATA PROCESSING

BACKGROUND

The subject matter disclosed herein relates to a method and system for processing data. In one embodiment, the data may be selectively processed with reference to a data parameter, such as video data quality.

DISCUSSION OF ART

Vehicle groups can include a lead vehicle and a remote or trailing vehicle. Each vehicle can include a data gathering device or sensor. One such device can be a camera system with a video device (e.g., video camera) to capture video and/or audio data.

The collected data volume may be large and unwieldy. To address the volume, it may be sometimes desirable to transmit and store the data in storage capacity that is located off-board the vehicle on which the data is being collected. It may also be desirable to have a system and method that processes data that differ from those systems and methods that are currently available.

BRIEF DESCRIPTION

Methods and systems are provided for processing data in a vehicle group. One example embodiment comprises evaluating one or more quality parameters of a first data set generated at a first vehicle in the vehicle group, and based on the evaluation, off-boarding the first data set. The data may be off-boarded for storage purposes, for example.

In one embodiment, the vehicle group is a consist including a plurality of rail vehicles (e.g., locomotives). Therein, a first rail vehicle may include a first data capture device for generating a first data set at the first rail vehicle, while a second rail vehicle includes a second data capture device for generating a second, different data set at the second rail vehicle. Based on an evaluation of one or more quality parameters of the first data set, the first data set is off-boarded from the first vehicle for storage purposes. For example, when the quality of the first data set is higher than a threshold, the first data set is off-boarded to, and stored on, a data storage device of the second vehicle. In comparison, when the quality of the first data set is lower than the threshold, the first data set is not stored on the second vehicle. Instead, the second data set generated at the second vehicle is stored at the second vehicle. It will be appreciated that the first data set may be similarly, and simultaneously, transmitted to each rail vehicle in the consist, and based on the evaluation, redundantly stored on each rail vehicle. Further, the first data set may also be stored on the first rail vehicle.

In this way, the large volume of data captured on a vehicle of a vehicle group can be off-boarded from the vehicle on which it was captured, thereby reducing issues related to storage capacity. Additionally, when the captured data is of a significant nature, the data can be redundantly stored at multiple locations. By off-boarding data based on one or more assessed quality parameters of the captured data, only effectual data is stored, and the storage capacity of a data storage device is not filled with ineffectual data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Vehicles may travel in groups, wherein one vehicle in the group may be designated as a lead vehicle and another as a remote vehicle based on, for example, the direction of travel of the group. By way of example, in a rail setting, a consist consisting of several locomotives may be grouped together. Other examples may include independently-controlled vehicles, such as a convoy of semi-tractor trailers on a highway, and dependently-controlled vehicles, such as off-highway mining dump trucks that are remotely controlled or controlled by autonomous systems.

Figure 1:
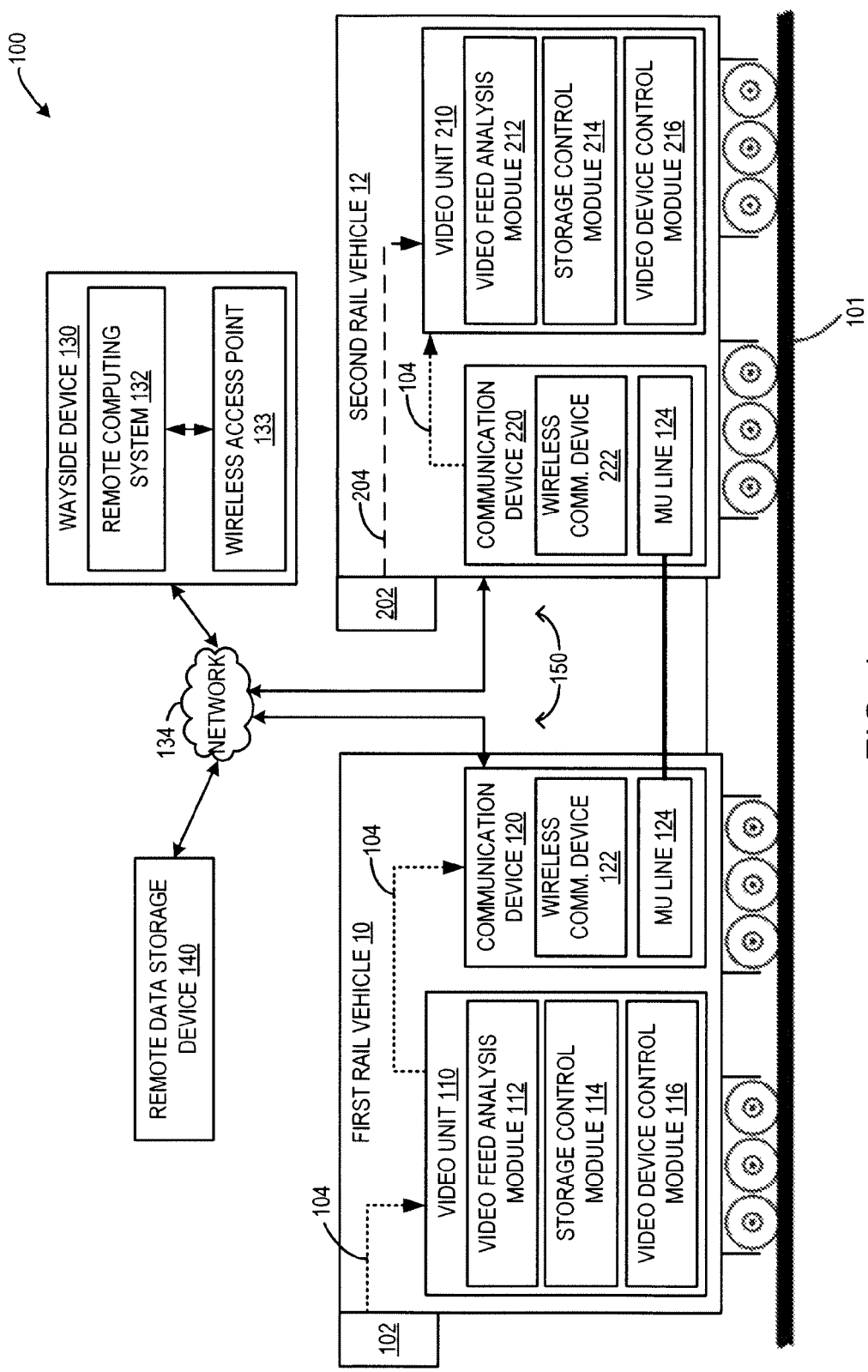
FIG. 1 shows an example embodiment of a vehicle group including a plurality of vehicles configured with respective data capture devices.
Figure 2:
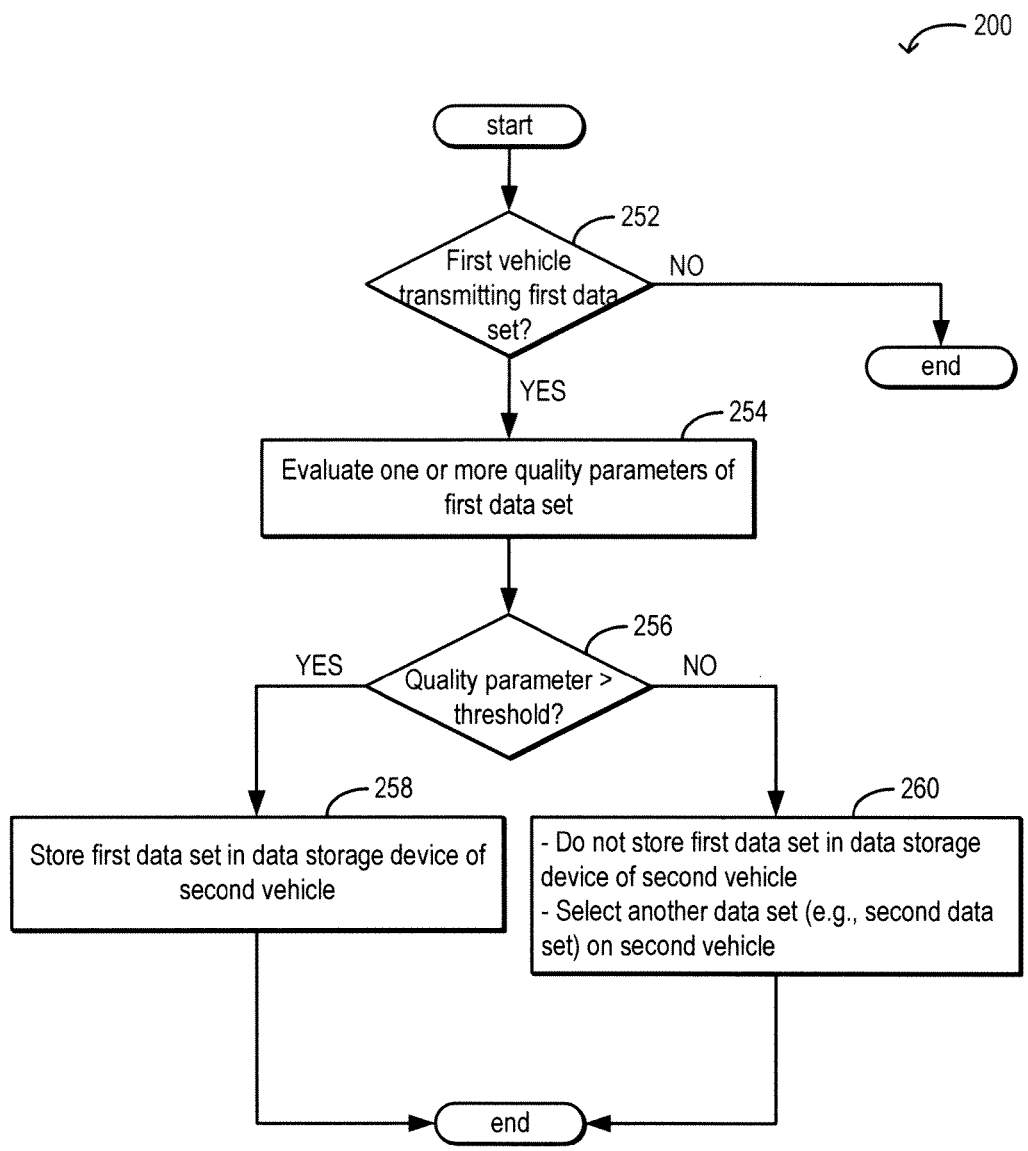
FIG. 2 shows a high level flow chart of a method for controlling data generation on a vehicle group, and off-board storage of the generated data, based on a quality parameter of the data.

One embodiment of a vehicle group is illustrated in FIG. 1, wherein a train system includes a first, lead vehicle and a second, remote vehicle. The vehicles include respective data capture devices for capturing data, such as audio-visual information, during vehicle operation. The respective data capture devices are in communication with respective video units, or data storage devices, and respective controllers operable to control storage and transmission of the data generated on the vehicle group. As shown in FIG. 2, a controller associated with the data capture device of the second vehicle is configured to receive data generated on, and transmitted from, the first vehicle. Based on an evaluation of one or more quality parameters of the transmitted data, such as based on file size and/or frame size variations of the data set (as elaborated in FIG. 3), the transmitted data may be off-boarded for storage purposes. For example, if the transmitted data is of a high quality, the transmitted data is off-boarded and stored as back-up storage on the second vehicle. In comparison, if the transmitted data is of a low quality, an alternate data set is selected for storage on the second vehicle, such as native data captured on the second vehicle. In this way, data generated by a vehicle group is better managed, and significant data transmitted from a lead vehicle is redundantly stored on one or more remote vehicles only if the transmitted data is of a suitable quality.

FIG. 1 is a schematic diagram of an example embodiment of a vehicle group system, herein depicted as consist 100, configured to travel on track 101. Consist 100 includes a plurality of vehicles configured to travel in a vehicle group. Based on a configuration of the vehicle group (e.g., based on a direction of travel, or based on a power distribution profile), one vehicle in the vehicle group is designated as a lead vehicle while the remaining vehicles are designated as remote vehicles. In the depicted example, consist 100 includes a first, lead vehicle 10 and a second, remote vehicle 12. The first vehicle 10 and the second vehicle 12 represent vehicles that provide tractive effort to propel consist 100. In one example, the plurality of vehicles are diesel-electric vehicles that each include a diesel engine (not shown) that generates a torque output that is converted to electricity by an alternator (not shown) for subsequent propagation to a variety of downstream electrical components, such as a plurality of traction motors (not shown) to provide tractive power to propel consist 100. While the depicted example shows the second vehicle 12 in a back-to-back configuration with the first vehicle 10, it will be appreciated that in an alternate embodiment, the second vehicle 12 may be in a nose-to-tail configuration with the first vehicle 10.

Although only two vehicles are depicted, it will be appreciated that consist 100 may include more than two vehicles. Furthermore, consist 100 may include rolling stock that does not provide power to propel the consist. For example, the first lead vehicle 10 and the second remote vehicle 12 may be separated by a plurality of units (e.g., passenger or freight cars) that do not provide propulsion. On the other hand, every unit in the vehicle group may include propulsive system components that are controllable from a single location.

First vehicle 10 is configured with a first data capture device 102 for generating a first data set 104 (dotted arrow) by capturing audio and/or visual information, as well as locomotive parameter information, at the first vehicle. Similarly, second vehicle 12 is configured with a second data capture device 202 for generating a second data set 204 (dashed arrow) by capturing audio and visual information, as well as locomotive parameter information, at the second vehicle. Based on the operating environment of the train consist, first and second data capture device 102, 202 may be designed to withstand harsh operating environments. In one example, first and second data capture device 102, 202 may include components such as a video camera and an audio recorder for capturing video and audio data. In one example, the video camera may be configured to capture video data in the visible spectrum, performing even at very low lumens. In still other examples, the video camera may be configured to capture video data in infra-red or other spectra.

Each of first data set 104 and second data set 204 captured by the first and second data capture devices may include, for example, video data from outside of the vehicle, audio data from outside of the vehicle, data from inside a vehicle cabin (e.g., vehicle operator cabin), etc. The captured data may also provide information regarding vehicle operating conditions (e.g., vehicle speed, direction of travel, time of travel, location, weather conditions along route, track conditions, etc.) as well as information regarding vehicle components (e.g., whether vehicle lights, horns, bells, etc. are on or off). The captured data may include a time-stamp, a scale-stamp, encryption data, a temperature-stamp, etc. As an example, based on a time-stamp on the captured data, a time of travel, speed of travel, distance covered, etc., may be determined. The scale-stamp on the data may vary responsive to a lens position of the camera, amount of zoom used, autofocus configurations, etc. The scale-stamp may also be used to determine the distance travelled. The encryption data may include identification code identifying the device generating the data (e.g., serial number, make, model, position of device) as well as the vehicle (e.g., location in consist, make, model, fleet, owning authority, etc.) on which the data is being generated. The temperature-stamp may indicate the ambient temperature of a region the consist is travelling through. Data generated by the first and/or second data capture device may be advantageously used to audit crossing equipment, inspect rights-of-way, train crews, and the like.

A first controller is coupled to the first data capture device 102 for initiating transmission of the first data set 104 captured by the first data capture device 102 off-board the first vehicle 10. First vehicle 10 further includes a first data storage device operable to store the first data set, or an alternate data set. In some embodiments, as depicted, the first controller and the first data storage device of the first vehicle are configured into a single unit, herein first video unit 110. In the depicted example, first video unit 110 includes a storage control module 114 configured to store the first data set 104 in electronic storage on the first vehicle. Storage control module 114 may include hardware and/or software for storing the first data set 104. In one example, first data set 104 is stored on the first rail vehicle as primary data storage, and stored off-board the first vehicle as redundant data storage. Herein, first data set can be stored in the primary storage location as a higher resolution data, while the first data set is stored in the redundant storage location as a lower resolution data. However, in alternate embodiments, such as where the first data set is stored off-board only, the first data set may always be stored as higher resolution data.

First video unit 110 may, optionally, further include a video feed analysis module 112 for analyzing a quality parameter of the first data set 104 generated by the first data capture device 102 at the first vehicle, as well as a video device control module 116 for controlling the first data capture device 102. When included, video feed analysis module 112 may evaluate a quality parameter of first data set 104 at the first vehicle before first data set 104 is transmitted from the first vehicle 10. Accordingly, in one embodiment, the first data set 104 is transmitted from the first vehicle 10 to one or more remote vehicles, such as second vehicle 12, only if the quality parameter of the first data set is higher than a threshold. As further elaborated with reference to FIGS. 2-3, based on an evaluation of the quality parameter of the first data set, the first data set may be off-boarded from the first vehicle 10 for storage purposes. Video feed analysis module 112 may include hardware and/or software configured to analyze and evaluate one or more quality parameters of the first data set. Similarly, video device control module 116 may include hardware and/or software configured to control first data capture device 102.

While the depicted example shows first data capture device 102 coupled to a first video unit 110, in alternate embodiments, the first controller (e.g., an on-board control system) may be coupled to the first data capture device 102, the controller including code for evaluating a quality parameter of the first data set before transmission, code for transmitting the first data set from the first vehicle 10 to the second vehicle 12 based on the evaluation, as well as code for recording the transmitted first data set 104 on the first vehicle (for example, on a dedicated first data storage device).

First data set 104 captured by first data capture device 102 is broadcast on a display (not shown) in the first vehicle 10. In one example, the display and the first video unit 110 are housed within a locomotive cab of the first vehicle to provide easy access to locomotive operating crew. A communication system 150 is configured to communicatively couple first vehicle 10 to other vehicles of the vehicle group, including second vehicle 12. Communication system 150 is linked to a network 134, and is further configured to couple each vehicle of the vehicle group to a remote data storage device 140 via network 134. The remote storage device may be a data storage device not located on the vehicle group, such as a data storage device located at a remotely located rail dispatch center. Communication system 150 includes communication devices of each vehicle of consist 100, such as communication device 120 on first vehicle 10 and communication device 220 on second vehicle 12. First data set 104 output by first data capture device 102 is transmitted from first vehicle 10 to one or more vehicles of consist 100, including second vehicle 12, via communication device 120 of communication system

150. Transmitted first data set 104 is received at second vehicle 12 via communication device 220 of communication system 150. The transmitted first data set 104 received at the second vehicle 12 may be broadcast on a display (not shown) in the second vehicle, such as, a display housed within a locomotive cab of the second vehicle 12. Communication device 120, 220 includes, for example, a wireless communication device 122 on the first vehicle 10, a wireless communication device 222 on the second vehicle 12, and multiple-unit lines 124. Still other devices may be possible, such as a satellite transceiver and a radio transceiver.

Wireless communication device 122, 222 dynamically establishes a wireless communication session with a wireless network, such as the wireless network 134 provided by the wireless access point 133 of a wayside device 130, to send and receive data communications between different vehicles of the consist 100. As consist 100 travels through different travel zones, the wireless communication device 122 detects different wireless network access points provided by wayside devices or other communication devices along the road track. In one example, a single wireless network covers a travel territory, and different wayside devices provide access points to the wireless network.

Multiple-unit (MU) lines 124 provide wired power connections between vehicles 10, 12 of the train system 100. In one example, the multiple-unit lines 124 (represented by thickened lines) include 27 pin cables that connect between each of the vehicles. The multiple-unit lines 124 supply 74 Volt, 1 Amp power to the vehicles. The power signal sent through the multiple-unit lines 124 is modulated to provide additional data communications capability. In one example, the power signal is modulated to generate a 10 MB/second information pipeline. Non-limiting examples of data communications passed through the multiple-unit lines 124 includes video data captured by a vehicle video device, travel information, vehicle state information, vehicle control commands, etc.

Wayside device 130 may embody different devices located along a road track. Non-limiting examples of wayside devices include signaling devices, switching devices, communication devices, etc. Wayside device 130 includes a remote computing system 132 configured to provide travel information to the train system 100. The wayside device 130 also includes the wireless access point 133 which allows the wireless communication devices 122, 222 on the different vehicles to connect to the wireless network 134.

A second controller is coupled to the second data capture device 202 for receiving the data set transmitted from the first vehicle 10. Second vehicle 12 further includes a second data storage device operable to store the first data set, or an alternate data set (such as the second data set). In some embodiments, as depicted, the second controller and the second data storage device of the second vehicle are configured into a single unit, herein second video unit 210. Second video unit 210 receives the transmitted first data set 104 at second vehicle 12 via communication device 220. Second video unit optionally evaluates one or more quality parameters of the received data set at the second vehicle. Based on the evaluation of the transmitted first data set 104, second video unit 210 either stores (that is, records) the first data set 104 or stores an alternate data set, such as second video data set 204 (dashed arrows) captured by second data capture device 202. For example, if the quality parameter of the first data set evaluated at the second vehicle is higher than a threshold, the first data is stored on the second vehicle. In comparison, if the quality parameter of the first data set is lower than the threshold, the first data is not stored on the second vehicle, and instead, the second data set is stored on the second vehicle. As such, the second data set 204 corresponds to native data captured at the second vehicle 12 by the second data capture device.

In the depicted example, second video unit 210 includes a video feed analysis module 212 configured to evaluate a quality parameter of the first data set 104, originating from the first data capture device 102 on-board the first vehicle 10, received at the second vehicle 12, and to further determine whether the evaluated quality parameter is higher than a threshold. Video feed analysis module 212 may include hardware and/or software configured to analyze the first data set 104 received at the second vehicle 12. In one embodiment, as elaborated in FIG. 3, video feed analysis module 212 evaluates the quality parameter of the transmitted first data set 104 based on, for example, a file size and/or frame variation of the transmitted data set. For example, the video feed analysis module 212 monitors the transmitted first data set over a predetermined duration, the duration based on a vehicle operating parameter, such as a vehicle speed or a vehicle's geographic location. If a variation in file size and/or frame (such as a point in the frame) of the transmitted first data set 104 over the predetermined duration exceeds a threshold amount, the module determines that the quality of the first data set is high and acceptable for storage on the second vehicle. Else, if the variation is less than the threshold, the module determines that the quality of the first data set is low, and not acceptable for storage on the second vehicle.

Second video unit 210 further includes a storage control module 214 configured to store the received first data set 104 in electronic storage if a quality parameter of the received first data set 104 is determined (by the video feed analysis module 212) to be higher than the threshold. If not, storage control module 214 stores the native second data set 204 originating from the second video device 202 on-board the second vehicle 12. Storage control module 214 may include hardware and/or software for storing the received first data set 104 and/or the native second data set 204 on second vehicle 12.

Video device control module 216 of second video unit 210 is configured to control the second data capture device 202 so that the second data capture device 202 generates the native second data set 204 only when the quality parameter of the first data set 104 received from the first vehicle is not higher than the threshold. Similarly, video device control module 216 is configured to avoid recording other data based on the evaluation. Video device control module 216 may include hardware and/or software for controlling the second data capture device 202.

In one embodiment, when the storage control module 214 stores first data set 104 received from the first vehicle 10, concomitantly, the transmitted first data set 104 is displayed on a display of the second vehicle 12. In comparison, when the storage control module 214 stores native second data set 204 captured by the second video device 202, concomitantly, the native second data set 204 is displayed on the display of the second vehicle.

While the depicted example shows the second data capture device coupled to a second video unit 210, in alternate embodiments, a second controller (e.g., on-board control system) may be coupled to the second data capture device 202, the controller including code for receiving the first data set transmitted by the first vehicle, code for evaluating a quality parameter of the first data set, and code for recording the transmitted first data set on the second vehicle (for example, on a dedicated second data storage device) while not recording other data (such as the native second data set), or recording the second data set (or an alternate data set) on the second vehicle, based on the evaluation.

Also, while the depicted embodiment illustrates off-boarding of the first data set from the first vehicle to the second vehicle in the vehicle group, this is not meant to be limiting, and in alternate embodiments, the first data set may be off-boarded to remote data storage device 140. As an example, during a condition when a link quality of communication system 150 is higher than a threshold, the first data set can be off-boarded to the remote storage location (e.g., at the dispatch center), while when the link quality is lower than the threshold, the first data set can be off-boarded to the second rail vehicle (and/or another rail vehicle of the consist).

Further, while the depicted embodiment illustrates transmission of the first data set from the first lead vehicle to the second remote vehicle, this is not meant to be limiting. In further embodiments, the first data set is similarly transmitted from the first lead vehicle to one or more remote vehicles in the vehicle consist, and redundantly stored on one or more or each of the remote vehicles based on the evaluation. Further still, in some embodiments, such as when the first data capture device on the first lead vehicle is not operative, or when there is insufficient data storage capacity on the second remote vehicle, data generated by a data capture device on a remote vehicle (such as second data set from the second remote vehicle) may be transmitted from the second vehicle to the first lead vehicle. In this way, at least some effectual data captured on the vehicle group can be redundantly stored.

FIG. 2 is a flow diagram of an example embodiment of a method 200 for transmitting and storing data captured on a vehicle group. As a non-limiting example, method 200 relates to transmission and storage of data generated on a first lead vehicle to one or more remote vehicles of a vehicle group. Method 200 can be performed by one or more modules of a first video unit 110 of first vehicle 10 and/or second video unit 210 of second vehicle 12, depicted in FIG. 1.

At 252, the method includes confirming that the first (herein, lead) vehicle is transmitting or streaming a first data set captured by the first data capture device. First data set may be transmitted from the first lead vehicle to a second remote vehicle (and/or other vehicles of the vehicle group) via a communication system including MU cables and/or wireless communication via a wayside device. In one example, a first controller coupled to the first data capture device of the first vehicle (or a first video feed analysis module of a first video unit on the first vehicle, as elaborated in FIG. 1) may be configured to evaluate a quality parameter of the first data set to determine if the first vehicle is streaming the first data. In another example, before transmitting the first data set, the first controller may be configured to evaluate a quality parameter of the first data set and initiate transmission of the first data set from the first vehicle only if, based on the evaluation (as elaborated in FIG. 3), it is determined that the quality parameter of the first data is higher than a threshold. In still other examples, the first data set is transmitted to the second vehicle without being evaluated before transmission (that is, the first data set may be transmitted as is). If no data is being transmitted or streamed to the second remote vehicle, the routine may end.

Upon confirmation of transmission, at 254, the routine includes evaluating one or more quality parameters of the first data set generated at the first vehicle. As elaborated in FIG. 3, this includes determining whether there is a variation in the first data set, and if so, whether the delta (that is, the variation) is higher than a threshold or not. For example, when a file size of the transmitted data set, or a point in a frame of the data set, varies more than a threshold amount over a predetermined duration, it is determined that the quality of the first data set is higher than a threshold and acceptable for off-boarding. In one example, the above-mentioned steps are performed at the second vehicle by a video feed analysis module of a video unit in the second vehicle.

At 256, the routine includes determining, based on the evaluation, if a quality of the transmitted video data is higher than a threshold or not. In one example, the evaluation is performed by the video feed analysis module of the second video unit on the second vehicle. If the quality of the first video data is higher than the threshold, then at 258, the routine includes off-boarding the first data set from the first vehicle to a data storage device (or video unit) on the second vehicle (and/or other vehicles of the vehicle group) for storage purposes. In alternate embodiments, the first data set may be off-boarded to a remote data storage device. As such, the transmitted video data may also be recorded on the first vehicle (e.g., on a storage module of a first video unit on the first vehicle) such that the first video data is recorded on the second vehicle as redundant storage.

In comparison, if the quality of the first video data is lower than the threshold, at 260, the routine includes not storing the first data set in the data storage device of the second vehicle, and instead, selecting another data set for storage on the second vehicle. For example, the second (native) data set output by the second data capture device of the second vehicle may be selected and stored on the data storage device of the second vehicle. In one example, the above mentioned steps of recording the transmitted first data set or the native second data set in a data storage device are performed by a storage control module of the second video unit on the second vehicle.

In one embodiment, when the storage control module of the video unit stores the first data set captured by the first data capture device and transmitted from the first vehicle, the transmitted first data set is concomitantly displayed on a display of the second vehicle. In comparison, when the storage control module stores native second data set captured by the second data capture device of the second vehicle, the native second data set is concomitantly displayed on the display of the second vehicle. During such a routine, a video device control module of the second video unit may be configured to control the second data capture device so as to ensure that the second data capture device generates the native second data set only when a quality parameter of the transmitted first data set received from the first vehicle is not high enough. The video device control module of the second video unit may also be configured to control the data storage device so as to ensure that the second data set is not stored when the first data set is being stored.

While the depicted embodiment illustrates transmission of the first data set from a first lead vehicle to a second remote vehicle, it will be appreciated that in alternate embodiments, the first data set captured by the first data capture device at the first lead vehicle may be transmitted to, and displayed on, one or more remote vehicles, each remote vehicle configured with respective data capture devices and video units. Thus, in the case of a vehicle group with multiple remote vehicles, if the data set transmitted from the lead vehicle is of a higher quality, the transmitted data set may be redundantly stored on one or more or each of the remote vehicles. In comparison, if the transmitted data is of a lower quality, each vehicle in the vehicle group may be configured to store native data captured by respective data capture devices on respective video units. In still another embodiment, if no data is being transmitted from the first lead vehicle (for example, due to the first data capture device of the first vehicle being inoperative, or due to limitations is storage capacity on the remote vehicle), and/or if the first data set is of a lower quality, data may be transmitted from a remote vehicle (such as the second vehicle) to the first lead vehicle and redundantly stored thereon.

Figure 3:
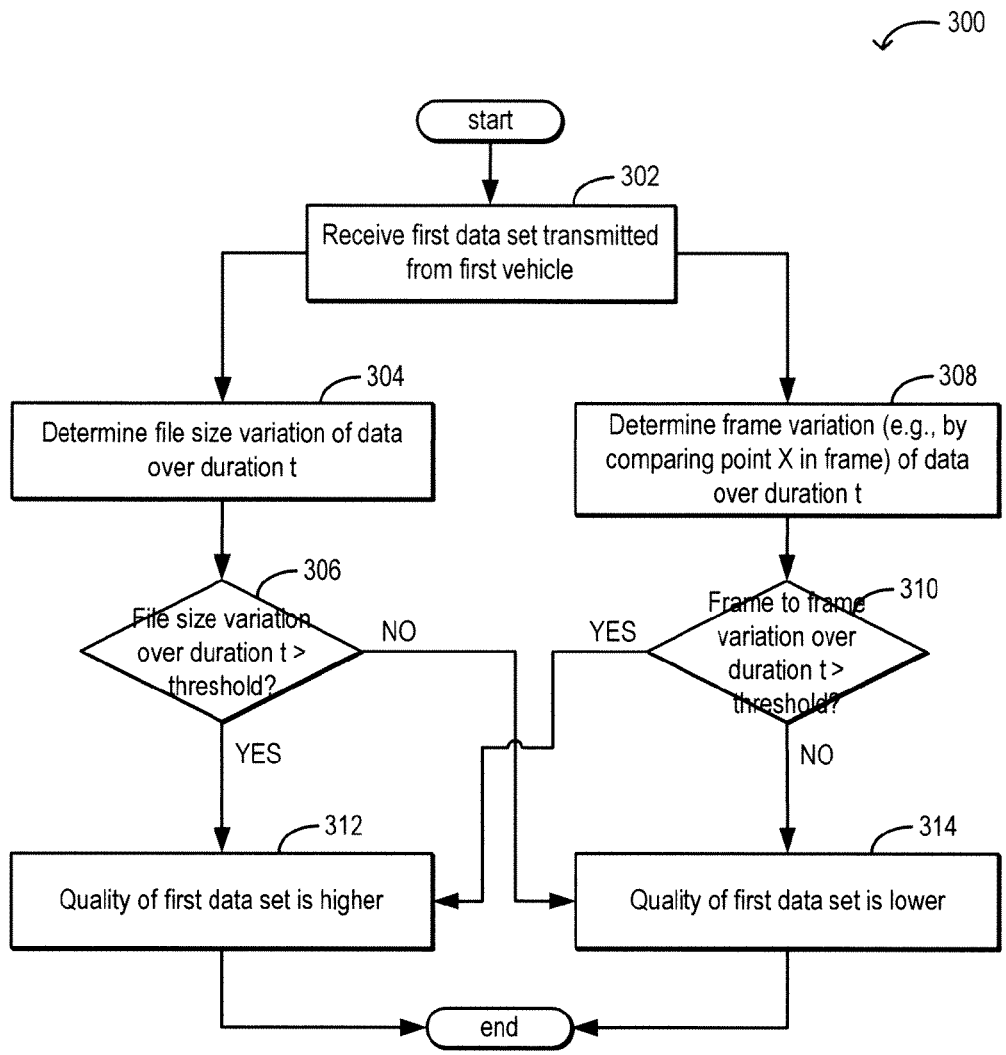
FIG. 3 shows a high level flow chart of a method for evaluating a quality parameter of the generated data.

FIG. 3 is a flow diagram of an example embodiment of a method 300 for evaluating one or more quality parameters of a data set captured by a data capture device on a first (e.g., lead) vehicle in a vehicle group and transmitted from the first vehicle to one or more remote vehicles of the vehicle group. In one example, one or more of the steps of method 300 are performed by one or more modules of second video unit 210 of second vehicle 12 and/or one or more modules of first video unit 110 of first vehicle 10 as depicted in FIG. 1.

At 302, the routine includes receiving the first data set transmitted from the first vehicle at the second vehicle. The quality of the transmitted first data set may then be evaluated (e.g., by the video feed analysis module of the second video unit of the second vehicle) based on, as non-limiting examples, file size variation and/or frame variation. In the depicted example, at 304, a file size (e.g., jpg file size) of the data set is monitored over a predetermined duration (t). The predetermined duration may be based on one or more operating parameters of the vehicle group including vehicle speed, configuration of vehicles in the vehicle group, vehicle position (e.g., geographic location), etc. In an alternate embodiment, the data set captured at the first data capture device is evaluated (e.g., by the video feed analysis module of the first video unit of the first vehicle) at the first vehicle before transmission there-from.

At 306, it is determined whether a variation in the file size of frames from the transmitted data set exceeds a threshold amount over the predetermined duration. As such, for a data set with a high quality of data feed, the file size will significantly vary. As one example, the file size of frames may vary from 200 KB to 250 KB and then to 220 KB over a duration. However, if all the frames are of the same file size, or are within a very small range of one another, for example, when the data set being streamed includes a blank screen, the data set may not include any useful information and may not be suitable for storage. Accordingly, at 312, if a change in a file size of the transmitted data set over the duration exceeds a threshold, the routine includes determining that the quality parameter of the transmitted data set is higher than a parameter threshold. In comparison, at 314, if a change in a file size of the transmitted data set over the duration does not exceed the threshold, the routine includes determining that the quality parameter of the transmitted data set is lower than a parameter threshold.

Additionally, or optionally, the transmitted data set may be evaluated based on frame variation. Herein, frames of the data set are compared to one another. This includes, at 308, monitoring and comparing a frame (e.g., a point X in the frame) of the data set over the predetermined duration. For example, a frame of the data set taken at a time point at the beginning of the predetermined duration (e.g., t1) is compared to a frame of the video data taken at a time point at the end of the predetermined duration (e.g., t2). At 310, the routine includes comparing the frames and determining whether frame to frame variation, over the duration, exceeds a threshold amount. Accordingly, at 312, if a frame variation of the transmitted data set over the duration exceeds a threshold, the routine includes determining that the quality parameter of the transmitted data set is higher than a parameter threshold. In comparison, at 314, if a frame variation of the transmitted data set over the duration does not exceed the threshold, the routine includes determining that the quality parameter of the transmitted data set is lower than a parameter threshold. In still other examples, the transmitted data set may be evaluated based on a stream quality, or a predefined "snapshot set" (that is, a subset of the full transmitted data set).

In a first example, data (e.g., video data) captured by a first data capture device of a first lead vehicle is stored on the first vehicle and transmitted, as is, to one or more remote vehicles, including a second (remote) vehicle. Upon receipt of the transmitted data set, a quality parameter of the received data set is evaluated (based on file size and/or frame size variation) at the second vehicle (and/or one or more remote vehicles). Based on the evaluation, specifically, if the quality parameter of the transmitted data set is determined to be higher than a threshold, the data set is off-boarded from the first vehicle and stored on the second vehicle (and/or one or more or each of the remote vehicles). If the quality parameter of the transmitted data set is determined to be lower than the threshold, then the transmitted data set is not off-boarded to, and stored on, the second vehicle (and one or more remote vehicles). Instead, native data captured at the second vehicle (and/or each remote vehicle) by respective data capture devices is stored on the respective vehicle.

In a second example, data captured by the first data capture device of the first (lead) vehicle is stored on the first vehicle and a quality parameter of the data set is evaluated (based on file size and/or frame size variation) at the first vehicle. If the quality parameter of the transmitted data set is determined to be higher than the threshold, the data set is transmitted to one or more remote vehicles, including the second vehicle. Upon receipt of the transmitted data set, the received data set is recorded, as is, on the second vehicle (and one or more or each remote vehicle). Herein, the received data set is recorded as transmitted from the first vehicle (that is, without further evaluation). If the quality parameter of the transmitted data set is determined to be lower than the threshold, then the data set is not off-boarded and transmitted from the first vehicle to the remote vehicles, and is only stored on the first vehicle. Optionally, data from a remote vehicle may be transmitted from the remote vehicle (e.g., second vehicle) to the first vehicle, and redundantly stored thereon. As such, native data captured at each remote vehicle by respective data capture devices may be stored on the respective vehicle.

In this way, the large volume of data captured on a vehicle of a vehicle group can be off-boarded from the vehicle on which it was captured, thereby reducing issues related to storage capacity. Furthermore, vital data captured on and transmitted from a lead vehicle of a vehicle group is recorded on one or more remote vehicles to ensure redundant storage only when the data is of an acceptable quality. As such, this ensures that a vehicle's memory storage is not occupied with ineffectual data. By storing native data captured by a data capture device of a remote vehicle when the quality of data generated at a lead vehicle is lower, storage of at least some effectual data is achieved.

An embodiment relates to a method of processing data. The method includes generating a first data set on a first vehicle in a vehicle group, evaluating a quality parameter of the first data set, and, based on the evaluation, off-boarding the first data set for storage purposes. The quality parameter is evaluated by estimating a file size variation of the first data set and/or a frame variation of the first data set over a time duration, and determining if the file size variation or frame size variation exceeds a parameter threshold. If the quality parameter of the first data set is higher than a quality threshold (e.g., if the file size variation or frame size variation exceeds the parameter threshold at all, or if the file size variation or frame size variation exceeds the parameter threshold by a certain amount or degree), then the first data set is off-boarded by transmitting the first data set from the first vehicle to a second vehicle of the vehicle group over a communication system of the vehicle group, and storing the transmitted first data set on the second vehicle. If the quality parameter of the first data set is lower than the quality threshold, the first data set is not transmitted from the first vehicle.

In an embodiment, a method comprises generating a first data set on a first vehicle in a vehicle group, storing the first data set, evaluating a quality parameter of the first data set, and processing the first data set according to the evaluation. In a first mode of processing, selected as a function of the evaluation, the first data set is erased. In a second mode of processing, selected as a function of the evaluation, the first data set is either left alone as stored, transferred to other storage (than where currently stored), and/or consolidated with other data. (In this context, "processing" includes potentially acting upon based upon an evaluation.) The quality parameter of the first data set is evaluated by estimating a file size variation of the first data set and/or a frame variation of the first data set over a duration (time period), and determining if the file size variation or frame size variation exceeds a designated threshold. If the file size variation or frame size variation does not exceed the designated threshold, the first data set is processed in the first mode of processing, for erasure. If the file size variation or frame size variation exceeds the designated threshold, the first data set is processed in the second mode of processing. (These steps can be carried out on the first vehicle alone, or across plural vehicles of the vehicle group. For example, in an embodiment, the first data set is generated on the first vehicle, but then transmitted to a second vehicle in the group for storage, evaluation, and processing in the first mode or the second mode, as a function of the evaluation.)

Unless otherwise specified (such as in the claims), embodiments of the invention are applicable to vehicles generally, and/or to vehicles with diesel engines. Thus, any instances of "locomotive" herein refer more generally to a vehicle or other vehicle, unless otherwise specified. The term "lead" vehicle as used herein refers to a vehicle designated for primary control of a vehicle consist, and not necessarily to the first vehicle in the consist. However, in some operational modes, the lead vehicle may be the first vehicle in the vehicle consist. "Remote" or "trail" vehicle as used herein refers to a vehicle set to take a subordinate role in consist control, e.g., a remote vehicle controlled based on control signals received from the lead vehicle, such as in distributed power operations.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc. are used to distinguish one element from another.

The invention claimed is:

1. A method of processing data in a vehicle group, comprising:
    evaluating, with a control system, one or more quality parameters of a first data set generated at a first vehicle in the vehicle group, the one or more evaluated quality parameters indicating a level of quality of the first data set; and
    based on the one or more evaluated quality parameters, selectively off-boarding the first data set for storage purposes, wherein the vehicle group includes a communication system configured to communicatively couple the first vehicle to other vehicles in the vehicle group, the communication system further configured to communicatively couple the vehicle group to a remote storage device, and wherein selectively off-boarding the first data set for storage purposes includes,
        during a first condition, off-boarding the first data set from the first vehicle to a second vehicle in the vehicle group via the communication system, and
        during a second condition, off-boarding the first data set from the first vehicle to the remote storage device via the communication system.

2. The method of claim 1, wherein the communication system is linked to a network, and wherein the first condition includes a link quality of the communication system being lower than a threshold, and wherein the second condition includes the link quality of the communication system being higher than the threshold.

3. The method of claim 1, wherein the first vehicle is coupled together with the second vehicle in a train or a consist, and wherein off-boarding the first data set from the first vehicle to a second vehicle includes,
    transmitting the first data set from the first vehicle to the second vehicle via the communication system;
    receiving the transmitted first data set at the second vehicle; and
    recording the transmitted first data set on the second vehicle.

4. The method of claim 3, wherein recording the transmitted first data set on the second vehicle includes not recording a second data set generated at the second vehicle of the vehicle group.

5. The method of claim 4, wherein the first data set includes audio and video data generated by a first data capture device of the first vehicle, and the second data set includes audio and video data generated by a second data capture device of the second vehicle.

6. The method of claim 1, wherein selectively off-boarding the first set of data for storage purposes further comprises selectively off-boarding the first set of data to multiple vehicles for redundant storage.

7. A method of processing data, comprising:
    generating a first data set on a first vehicle in a vehicle group with a first data capture device;
    evaluating a quality parameter of the first data set with a controller by estimating a file size variation of the first data set and/or a frame variation of the first data set over a duration, and determining if the file size variation or the frame variation exceeds a parameter threshold, the quality parameter indicating a quality of the first set of data relative to a quality threshold; and
    based on the evaluation, off-boarding the first data set for storage purposes.

8. The method of claim 7, wherein the duration is based at least in part on an operating parameter of the vehicle group.

9. The method of claim 8, wherein the operating parameter includes vehicle speed.

10. The method of claim 7, wherein the quality parameter of the first data set is evaluated at the first vehicle, and wherein off-boarding the first data set based on the evaluation includes,
    if the quality parameter of the first data set is higher than the quality threshold, transmitting the first data set from the first vehicle to a second vehicle of the vehicle group over a communication system of the vehicle group, and storing the transmitted first data set on the second vehicle; and if the quality parameter of the first data set is lower than the quality threshold, not transmitting the first data set from the first vehicle.

11. The method of claim 7, further comprising,
transmitting the first data set from the first vehicle over a communication system of the vehicle group; and
receiving the transmitted first data set at a second vehicle of the vehicle group, wherein evaluating the quality parameter of the first data set includes evaluating the quality parameter of the first data set at the second vehicle.

12. The method of claim 11, wherein off-boarding the first data set based on the evaluation includes,
if the quality parameter of the first data set evaluated at the second vehicle is higher than the quality threshold, storing the first data set on the second vehicle; and
if the quality parameter of the first data set evaluated at the second vehicle is lower than the quality threshold, not storing the first data set on the second vehicle.

13. The method of claim 12, further comprising, generating a second data set on the second vehicle, and if the quality parameter of the first data set is lower than the threshold, storing the second data set on the second vehicle.

14. The method of claim 13, wherein the first vehicle is coupled to the second vehicle in a train or a consist, and wherein the first data set is generated by a first data capture device of the first vehicle, and wherein the second data set is generated by a second data capture device of the second vehicle.

15. The method of claim 14, wherein each of the first data set and second data set include audio and video data.

16. The method of claim 15, wherein the first vehicle includes a first video unit and the second vehicle includes a second video unit, and wherein storing the first data set on the second vehicle includes recording the first data set on the second video unit of the second vehicle, and wherein storing the second data set on the second vehicle includes recording the second data set on the second video unit of the second vehicle.

17. The method of claim 16, further comprising, storing the first data set on the first video unit of the first vehicle.

18. The method of claim 7, wherein off-boarding the first data set for storage purposes further comprises selectively off-boarding the first set of data to multiple vehicles for redundant storage.

19. A system, comprising:
a first data capture device associated with a first vehicle of a plurality of vehicles coupled together in a train or a consist;
a first controller coupled to the first data capture device for initiating transmission of data captured by the first data capture device off-board the first vehicle to a data storage device; and
a second controller coupled to the data storage device, the second controller having non-transitory code operable to:
receive the transmitted data;
evaluate a quality parameter of the transmitted data;
determine a level of quality of the transmitted data based on the evaluation of the quality parameter of the transmitted data; and
record the transmitted data or select another data for recording based on the determined level of quality of the transmitted data.

20. The system of claim 19, wherein the first controller is operable to initiate recording of the transmitted data on the first vehicle.

21. The system of claim 20, wherein the second controller is operable to avoid recording other data based on the evaluation of the transmitted data.

22. The system of claim 21, wherein the data storage device is a remotely located data storage device.

23. The system of claim 21, wherein the data storage device is associated with a second vehicle of the plurality of vehicles, the second vehicle being coupled to the first vehicle in the train or the consist.

24. The system of claim 23, wherein recording the transmitted data or selecting another data based on the evaluation includes:
recording the transmitted data on the data storage device when the quality parameter of the transmitted data is above a threshold; and
recording native data captured by a second data capture device associated with the second vehicle when the quality parameter of the transmitted data is below the threshold.

25. The system of claim 24, wherein the quality parameter evaluated includes a file size variation and/or a frame variation of the transmitted data over a duration.

26. The system of claim 25, wherein the duration is based at least in part on an operating parameter of the vehicle group.

27. The system of claim 26, wherein the operating parameter includes vehicle speed.

* * * * *